March 2, 1926.
J. P. FISHER
1,575,260
PROCESS AND APPARATUS FOR DISTRIBUTING GAS TO CONSUMERS
Filed May 4, 1921
2 Sheets-Sheet 2
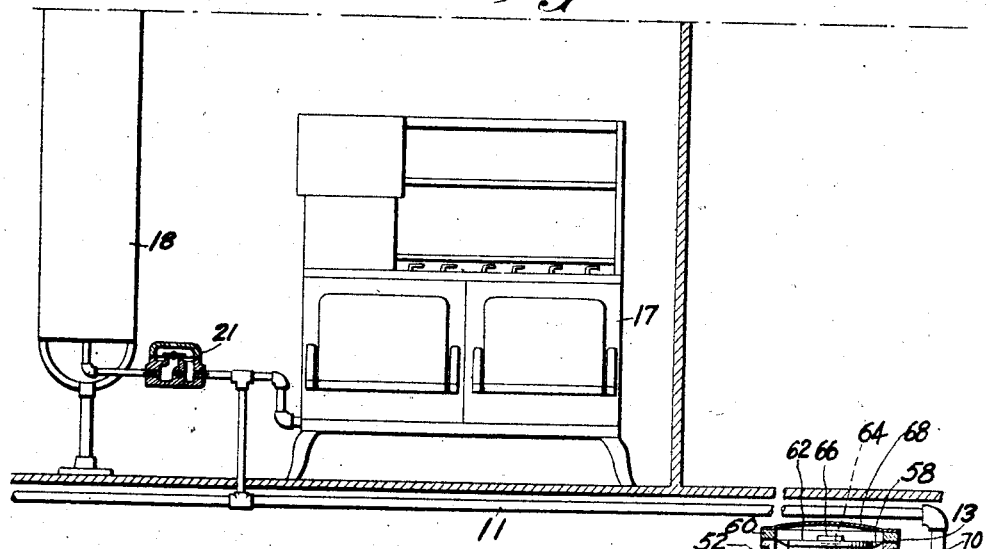
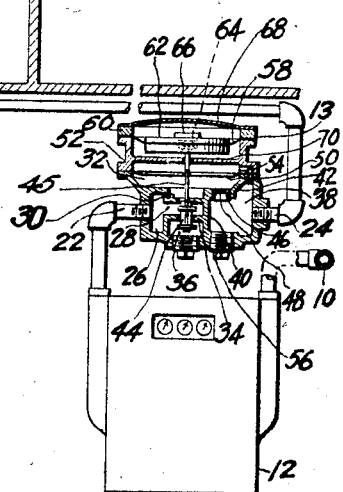
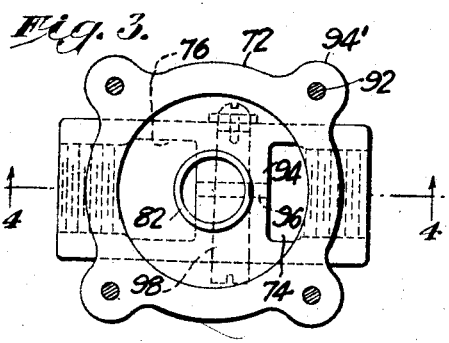
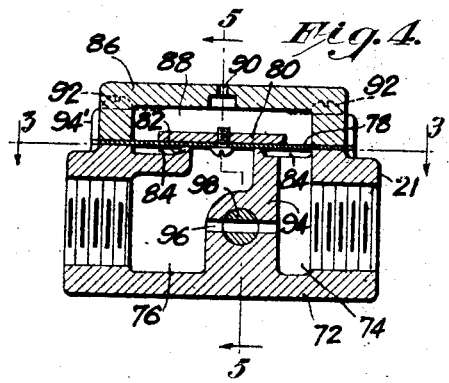
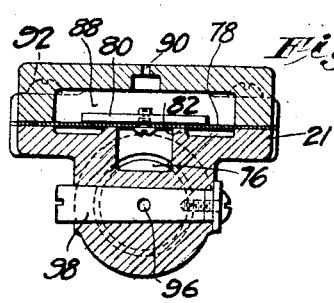
James P Fisher Inventor
By His Attorney
Edmund G Borden Patented Mar. 2, 1926.

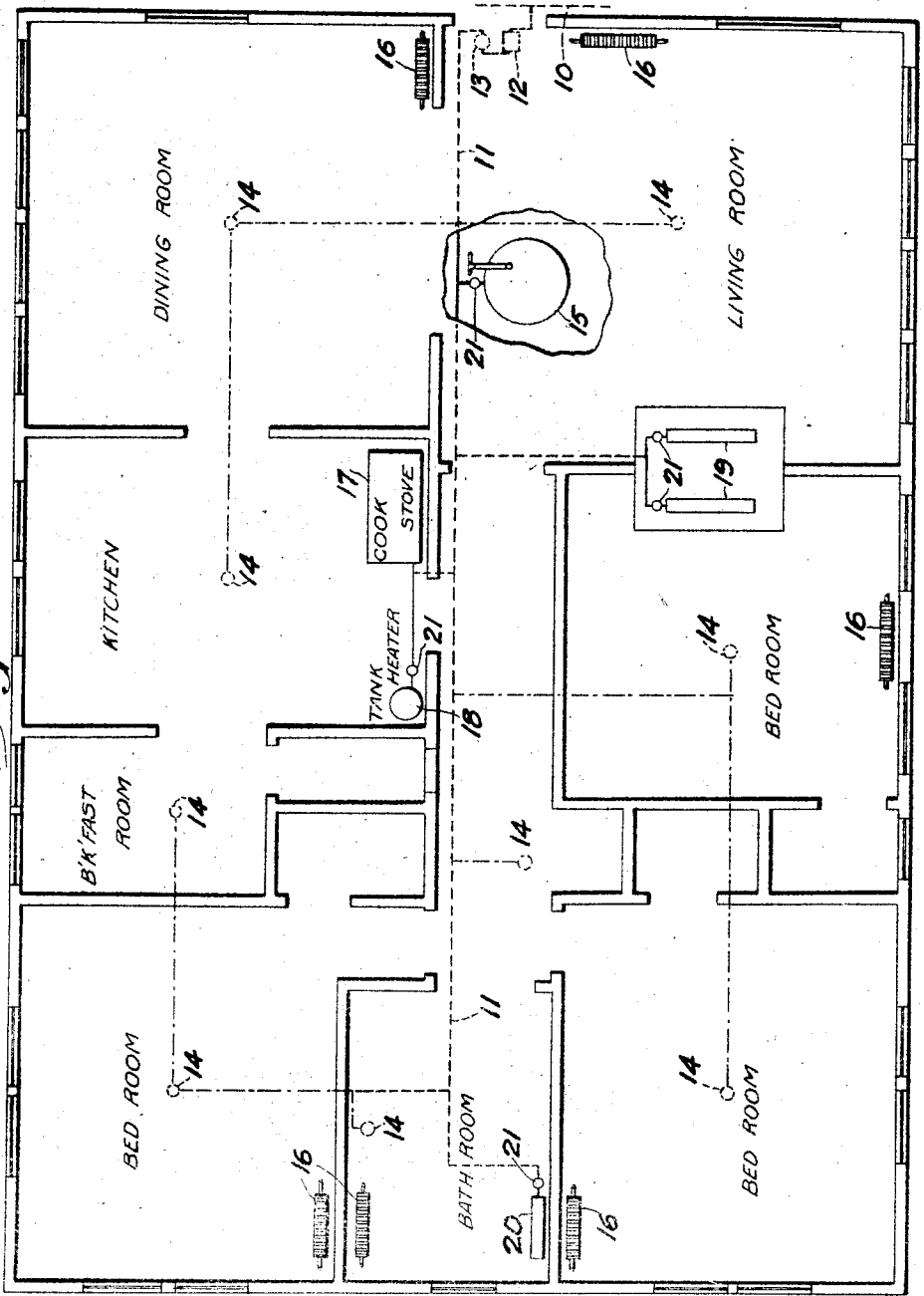

1,575,260

UNITED STATES PATENT OFFICE.

JAMES P. FISHER, OF BARTLESVILLE, OKLAHOMA, ASSIGNOR TO DOHERTY RESEARCH COMPANY, OF NEW YORK, N. Y., A CORPORATION OF DELAWARE.

PROCESS AND APPARATUS FOR DISTRIBUTING GAS TO CONSUMERS.

Application filed May 4, 1921. Serial No. 466,761.

*To all whom it may concern:*

Be it known that I, JAMES P. FISHER, residing at Bartlesville, in the county of Washington, State of Oklahoma, have invented certain new and useful Improvements in Processes and Apparatus for Distributing Gas to Consumers; and I do hereby declare the following to be a full, clear, and exact description of the invention, such as will enable others skilled in the art to which it appertains to make and use the same.

This invention relates to a process and apparatus for distributing gas to consumers and is particularly intended for use in connection with the method of charging for gas which is known to the trade as the "Doherty three-part rate."

The "Doherty three-part rate" includes a customer charge, a demand charge, and a consumption charge. The customer charge is the same for all consumers and represents the share of each consumer in those expenses of the gas distributing company which depend only on the number of customers served irrespective of the amount of gas used by them. Included among such expenses are the costs of meter reading and of rendering bills. The demand charge is based on the outlay which those engaged in the business of producing and distributing gas are required to make in order to enable them to supply each consumer at any time with all the gas he desires to use. The sum of the demand charges is proportioned to the plant investment necessary for supplying the total maximum demand on the distributing system. The expenses incident to plant investment are properly apportioned to the consumers in proportion to their maximum demands, so that of two consumers having different maximum demands, the one having the larger maximum demand is required to pay the larger demand charge. The demand charge is independent of the amount of gas actually used by a consumer over a given period, for example, one year, since, if a consumer should use gas but one day in the year, he would impose upon those engaged in the business of producing and distributing the gas the burden of making such provision in the way of plant equipment as would enable them to serve him when and to the extent that he desired service. The consumption charge is based on the amount of gas actually used, and is the same for all consumers per thousand cubic feet of gas. The customer charge and the demand charge constitute together what may appropriately be termed a readiness-to-serve charge, as distinguished from the charge for the amount of gas used.

In purchasing gas under a readiness-to-serve charge which is larger or smaller in accordance as his maximum demand is larger or smaller, it is of advantage to a consumer that his demand be limited to his actual requirements in order to keep the demand charge at a minimum. Devices for thus limiting the amount of gas which a consumer can take from the supply mains of a gas distributing system are shown in the application for Letters Patent of the United States of Earl S. Rush, Serial No. 425,196, filed Nov. 19, 1920, and my application, Serial No. 424,144, filed November 15, 1920, for fluid controlling mechanisms.

The process and apparatus of this invention are particularly adapted for use in the distribution of gas under a readiness-to-serve charge system inclusive of a demand charge. To this end a feature of the invention consists in limiting the amount of gas which a consumer can take from the supply main and controlling the distribution of the gas available to the consumer so as to give a preference in the consumption of the gas to certain of his appliances over other of his appliances, when the limited amount of gas available is insufficient to afford a full supply to all the appliances which he may wish to use. In this way the consumer is assured of a full supply of gas at all times to those appliances the use of which is most imperative, such, for example, as a cook stove, and is enabled to keep down his demand charge by using other appliances, such, for example, as a tank heater or a furnace, at times when the cook stove is not in use.

A further feature of the invention resides in limiting the amount of gas which a consumer can take from the supply mains and regulating the pressure of the gas in accordance with the requirements of the appliance used by him.

Still other features of the invention relate to means for limiting the demand of a consumer and means for automatically discontinuing the main flow of gas to certain of his appliances when necessary to cause gas to be delivered at suitable pressure to other of his appliances.

In the illustrated construction, the main flow of gas to certain of the appliances is cut off by a valve which is arranged to keep a pilot of the appliance burning, if the appliance is equipped with a pilot, or to prevent the flame from being extinguished at the burner.

Other objects and features of the invention, including a valve operable automatically to substantially discontinue the flow of gas to certain of the appliances of a consumer under the control of the gas pressure in the piping of the consumer, will appear as the description proceeds and will be pointed out in the appended claims.

In the drawings which illustrate a preferred embodiment of the invention;

Fig. 1 is a diagrammatic view in plan of a dwelling of the bungalow type to which gas is distributed in accordance with the invention;

Fig. 2 is a view in elevation of a tank heater and cook stove and apparatus for distributing gas to them;

Fig. 3 is a plan view of the lower member of the preferential device taken on the line 3—3 of Fig. 4;

Fig. 4 is a sectional elevation of the preferential device taken on the line 4—4 of Fig. 3, and Fig. 5 is a sectional elevation of the preferential device taken on the line 5—5 of Fig. 4.

In the use of the invention as illustrated in Fig. 1, gas from the supply main 10 passes to the piping 11 of the dwelling through a volume meter 12 of conventional form and a combined pressure regulator and demand limiting device 13 of the character shown in my above-mentioned application, Serial No. 424,144. As shown, the piping 11 is arranged to supply gas to the following appliances: lights 14 in all of the rooms, the furnace 15 which heats the radiators 16 through the medium of steam or hot water, a cook stove 17, a tank heater 18, heaters 19 in the living room and adjacent bed room, and a heater 20 in the bath room.

In purchasing gas at a price which includes a fixed charge per thousand cubic feet of gas used and a demand charge which varies with the maximum rate at which gas is withdrawn from the supply main, the minimum cost to a consumer for a given amount of gas would obviously be obtained when the gas was burned at the lowest possible maximum rate, or, in other words, when the consumer's hourly consumption of gas approximately equalled the limits set by his demand. In order, therefore, for a consumer to obtain the amount of gas required by him at the least cost, it is necessary for him to forego the use of all of his gas burning appliances at any one time and to utilize certain of his appliances at some periods of the day, and other of his appliances at certain other periods of the day. In many cases a consumer can obtain satisfactory service with a demand limit approximately equal to the rate of the consumption of gas in that one of his appliances which has the largest gas consuming capacity. For example, in a dwelling such as is illustrated in Fig. 1, the consumer may obtain satisfactory service at low cost by adopting a demand limit which is little more than that required to afford a full supply of gas to the cook stove 17. In such an event the supply of gas will be sufficient to permit the efficient use of the cook stove and the lights 14 at the same time, inasmuch as the capacity of the lights is relatively small. At such times as the consumer desires to use all of the gas permissible under his rate for cooking or for cooking and lighting, little or no gas would be burned in the furnace 15 or the heaters 19 and 20. When the use of the cook stove is no longer required, as when a meal has been prepared, the furnace 15 may be started up, or in the event that special heating is desired in the living room or the bath room, the heater 19 or 20 or both may be lighted. The cook stove 17 will not ordinarily be operated for any long period so that the main heating of the house may be conveniently effected when the cook stove is not in use, and the radiators 16 may be relied upon to maintain the temperature of the dwelling until a supply of gas is again available to the furnace 15 and heaters 19 and 20. The tank heater 18 may, without inconvenience, be employed only at times when gas is not being consumed either in the cook stove 17 or the furnace 15.

It is essential that certain of the gas burning appliances in a dwelling shall be capable of efficient use whenever it may be desired to use them. The above is true, for example, of the cook stove and of the lights in the various rooms of the dwelling. Consequently, if the supply of gas which a consumer can take from the supply main is limited, as for example, by the device 13 to a point such as not to afford a full supply of gas to all of the appliances in his dwelling simultaneously, it becomes necessary, in case most or all of the other appliances are turned on at a time when the consumer wishes to use the cook stove 17, that the flow of gas to some of the appliances shall be restricted or discontinued.

By the use of this invention a gas consumer is enabled to obtain efficient service from certain of his appliances at all times without the necessity of turning off other appliances which he may have in use. In the illustrated construction, this is effected by devices 21 which are inserted in the piping leading to the appliances of least imperative use and which automatically restrict the flow of gas to such appliances when necessary to cause gas to be delivered at suitable pressure to other appliances. As shown, devices 21 are installed in the piping leading to the furnace 15, the tank heater 18, and the heaters 19 and 20. The devices 21 are constructed so as substantially to discontinue the flow of gas to the furnace 15, the tank heater 18, and the heaters 19 and 20 when necessary to cause a full supply of gas to be delivered to the cook stove 17 and lights 14. For convenience in description, the devices 21 may be termed "preferential devices," and the appliances which are assured of a full supply of gas at all times may be said to be "preferred" over the other appliances. The lights 14 are preferred not only because it is not ordinarily convenient to subordinate them in use to other appliances but also because efficient illumination, particularly when natural gas is burned, cannot be obtained at low pressure with the lamps now on the market.

For the sake of clearness of illustration the volume meter 12, the combined pressure regulator and demand limiting device 13, and the preferential device 21, as shown in Fig. 2, are of exaggerated size in proportion to the cook stove 17 and tank heater 18.

The combined pressure regulator and demand limiting device 13 (Fig. 2) comprises a housing provided with an inlet 22 and an outlet 24. The frame structure of the housing is shaped inwardly of the inlet 22 to form an inlet chamber 26 communicating with a channel 28. The channel 28 is separated by an upper wall 30 from the lower portion of a diaphragm chamber 32 and by a lower wall 34 from passages 36 extending downwardly from the diaphragm chamber 32 at each side of the channel 28 and meeting below the wall 34.

The housing of the device 13 is formed to provide an outlet conduit comprising a chamber 38 communicating with the outlet 24 and demarcated from the channel 28 and the passages 36 by a wall 40 and from the diaphragm chamber 32 by a wall 42. An opening in the wall 42 allows gas to pass from the diaphragm chamber 32 to the outlet chamber 38. From the foregoing, it will be understood that the course followed by gas in passing through the device 13 is from the inlet chamber 26 and channel 28 to the diaphragm chamber 32, either directly or through the passages 36, and then through the opening in the wall 42 to the outlet chamber 38.

As hereinbefore indicated, means is provided both for limiting the rate of flow of gas through the device 13 and for regulating the pressure at which gas is delivered from it. Preferably, and as shown, such means includes a double poppet valve 44 provided with a stem 45 and formed with horizontally disposed circular flanges operable upon upward movement of the valve to close openings in the walls 30 and 34 respectively. The device is preferably provided below the valve 44 with a screw plug allowing access to be had to the valve.

In order to cause the valve 44 to control the rate of flow of gas through the device 13, utilization is made of the principle governing the flow of fluids whereby if flow is restricted at a point in a fluid conductor, the withdrawal of fluid from one side of the point of restriction will cause the pressure of the fluid on that side to become less than the pressure on the opposite side of the point of restriction. Moreover, when the flow of fluid is thus restricted, the more rapidly it is withdrawn from the conductor, the greater is the pressure differential on opposite sides of the point of restriction. In the illustrated construction, the means for applying the enunciated principle includes a disc 46 inserted in the opening of the wall 42 and being formed with an orifice 48 of relatively small size so as to allow only a restricted flow of gas from the lower portion of the diaphragm chamber 32 to the outlet chamber 38 and thereby cause a drop in pressure in the outlet chamber 38 as gas is withdrawn from the device through the outlet 24.

A weighted diaphragm 50 clamped, preferably, between the lower portion of the device 13 and a ring portion 52 is subjected on its under side to the pressure of the gas on the supply side of the orifice disc 46, and a conduit 54 leading from the outlet chamber 38 communicates with the interior of the ring 52 above the diaphragm 50 so as to transmit the pressure of the gas in the outlet chamber 38 to the upper side of the diaphragm. The floor of the outlet chamber 38 is formed with an opening normally closed by a plug 56. Upon removal of the plug 56, this opening allows an orifice disc to be removed and another having a larger or smaller opening to be substituted for it.

The valve stem 45 extends upwardly from the valve 44 and passes loosely through an eye or the like (not shown) carried centrally by the diaphragm 50. The stem 45 of the valve is formed above the diaphragm 50 with an enlarged portion of larger diameter than the opening in the eye. The diaphragm 50 is weighted in the usual way to maintain it normally depressed, thus allowing the valve 44 to occupy its fully opened position. When, however, the gas pressure on the under side of the diaphragm 50 is sufficiently in excess of that on its upper side to counterbalance the weight of the diaphragm and the parts associated with it, the valve tends to close.

To the end that the valve 44 may be operated also to control the pressure at which gas is delivered from the device 13, a second diaphragm 58 is provided in the housing of the device above the diaphragm 50. As shown, the periphery of the diaphragm 58 overlies the ring 52 and is clamped thereto by a ring 60 attached to the ring 52 by screws or the like (not shown). The diaphragm 58 is loaded by plates 62. The valve stem 45 is provided at its top with a head adapted to be received in a cavity or chamber 64 in the plates 62 of greater cross-sectional dimensions than the head. The lower plate 62 is formed with a portion underlying the head of the valve stem and provided with an opening of greater diameter than the enlarged portion of the valve stem to allow it to be raised independently of the plates 62 or diaphragm 58. With this construction, however, when the diaphragm 58 is raised, the valve 44 will also be raised.

A plug 66 closes the chamber 64 to prevent the passage of gas about the valve stem 45 to the space above the diaphragm 58. The top of the device is preferably provided with a cap 68 having openings (not shown) permitting the upper side of the diaphragm 58 to be subjected to atmospheric pressure. Interposed between the diaphragms 50 and 58 and serving to define separate chambers for the diaphragms is a baffle plate 70. The baffle plate 70 is formed centrally with an opening in which the enlarged portion of the valve stem 45 is loosely received. This opening acts to transmit the pressure of the gas above the diaphragm 50 to the under side of the diaphragm 58.

The manner of operation of the device 13 is as follows:

Assuming that the device is installed in a pipe line of a gas distributing system but that there is no flow of gas through it, the pressure of the gas in the outlet chamber 38 and on the upper side of the diaphragm 50 equals the pressure on the under side of the diaphragm. Consequently, the diaphragm 50 will be fully depressed and, if the diaphragm 58 is also depressed, the valve 44 will occupy its fully opened position. The gas contained in the space defined by the diaphragms 50 and 58 and ring 52, exerts pressure on the under side of the diaphragm 58, as well as on the diaphragm 50. The maximum allowed pressure of the gas in the outlet chamber 38 is determined by the weight of the plates 62, valve 44, and valve stem 45, it being apparent that when the pressure of the gas in the outlet chamber 38 is sufficiently above atmospheric pressure to counterbalance the weight of the above mentioned parts, the valve 44 will tend to close. The tendency of the valve 44 to close under the conditions specified exists whether gas is or is not flowing through the device.

If a relatively small amount of gas is withdrawn from the outlet chamber 38, for example, by reason of the ignition of some of the lights 14 or the heater 20, the pressure in the outlet chamber 38 will be slightly decreased as compared with that in the lower portion of the diaphragm chamber 32, thus inducing a slight flow of gas through the device. The pressure differential in the chamber 38 and the lower portion of the diaphragm chamber 32 is transmitted to opposite sides of the diaphragm 50. The maximum differential across the diaphragm 50 and, consequently, the maximum rate of flow of gas through the device 13 with an orifice 48 of a given size is determined by the weight on the diaphragm 50 plus the weight of the valve 44 and valve stem 45. So long as the flow of gas through the device 13 is below the maximum rate, the diaphragm 50 will not operate to close the valve 44, which, under such conditions of flow of gas is under the control of the diaphragm 58. Inasmuch as the stem 45 of the valve 44 passes through the eye of the diaphragm 50, the valve may be operated by the diaphragm 58 independently of the diaphragm 50.

If the consumption of gas from the piping 11 is increased, for example, by turning on the cook stove 17, the maximum differential may be set up across the diaphragm 50, thus marking the maximum rate of flow of gas through the device. The rapid withdrawal of gas from the outlet chamber 38 incidental to the establishment of the maximum rate of flow of gas through the device causes the pressure in the outlet chamber 38 and, consequently, on the upper and lower sides of the diaphragms 50 and 58 respectively to be relatively small. As a result, the diaphragm 58 will occupy its lowermost position under the action of the weight of the parts associated with it. The diaphragm 58 operates at all times to prevent the pressure of the gas in the outlet chamber 38 from exceeding a predetermined degree and further tends, so long as the pressure on the inlet side of the device exceeds the pressure at which the device is set to deliver and the rate of flow of gas is below the predetermined maximum, to maintain the gas in the outlet chamber 38 at a constant pressure, inasmuch as the diaphragm 58 will be depressed in the event that the pressure of the gas in the outlet chamber 38 falls below the prescribed degree, thus opening the valve 44 more widely and enabling a larger flow of gas through the device.

From the foregoing, it will be understood that when the flow of gas through the device 13 tends to exceed the maximum rate determined by the weight of the load on the diaphragm 50 plus the weight of the valve 44 and valve stem 45, the upper diaphragm 58 is no longer operative to control the valve 44, the action of the valve being then governed entirely by the diaphragm 50. In the event of movement of the valve 44, in preserving a uniform flow of gas, the enlargement of the valve stem 45 moves upwardly and downwardly in the cavity 64 in the lower plate 62.

If, after the maximum rate of flow had been established through the device 13, other of the appliances connected with the piping 11 were turned on, and no means were provided for controlling the flow of gas to the appliances from the piping 11, the result would be to decrease the pressure of the gas in the piping 11 in accordance with the capacity of the appliances being used. In this way the pressure of the gas in the piping 11 might be so reduced as to prevent the efficient use of any of the appliances served by it. Whenever the rate of flow of gas after having attained the maximum degree is reduced below such degree, the valve 44 again comes under the control of the pressure regulating diaphragm 58.

The maximum allowed rate of flow of gas through the device 13 may be increased by adding to the weight of the load on the diaphragm 50 or by employing a disc 46 having a larger orifice than the disc previously in use. Likewise, the pressure at which gas is delivered from the device may be increased or decreased by increasing or decreasing the load on the diaphragm 58.

Each of the preferential devices 21 is of substantially circular cross-section and comprises a lower member 72 formed to provide an inlet conduit 74 at one side of the member and an outlet conduit 76 opening upwardly through the central portion of the member. A diaphragm 78 overlies the member 72 and serves as a valve to control the flow of gas from the inlet conduit 74 to the outlet conduit 76. The diaphragm valve 78 is weighted by a plate 80 which retains it normally in closed position but which permits the valve to be opened by the pressure of the gas in the conduit 74 when it exceeds a degree predetermined by the weight of the plate 80. Preferably and as shown, the outlet conduit 76 is projected upwardly above the adjacent portions of the member 72, as indicated at 82, so as to provide an annular chamber 84 surrounding the outlet conduit 76 and communicating with the inlet conduit 74. The chamber 84 causes the pressure of the gas on the inlet side of the device 21 to be transmitted equally to the diaphragm valve 78 on all sides of the outlet conduit 76, thus conducing to a proper action of the diaphragm valve.

Superimposed on the member 72 and the diaphargm valve 78 is a member 86 formed to provide a chamber 88. The chamber 88 communicates with the atmosphere through an opening 90 so that the upper side of the diaphragm valve 78 is subjected to atmospheric pressure. The lower member 72, diaphragm valve 78, and upper member 86 may conveniently be maintained in assembled relation by means of screws 92 fitted in ears 94' in the members 72 and 86.

If the supply of gas were entirely shut off from a gas burning appliance thus causing the flame to be extinguished at the appliance, and if the flow of gas to the appliance were afterward automatically resumed, unburned gas would escape from the appliance. In order to prevent such a condition from arising in the use of the appliance 21, the wall 94 between the conduits 74 and 76 of the device is formed with an opening 96 adapted to permit a small flow of gas at all times from the inlet conduit 74 to the outlet conduit 76. The passage of gas through the opening 96 is controlled by a valve 98. If the device 21 is associated with an appliance provided with a pilot, the valve 98 of the device will be set so as to pass sufficient gas to maintain a flame at the pilot. If, on the other hand, the appliance with which the device is associated is not provided with a pilot, the valve 98 will be set so as to pass at all times an amount of gas sufficient to maintain a low flame in the burners of the appliance and to assure that the flame in the appliance will not be extinguished.

So long as the pressure on the inlet sides of the devices 21 is greater than that equivalent to the weights of the plates 80 on the diaphragms 78, the diaphragm valves will be raised from their seats, thus allowing unimpeded flow of gas through the devices 21 to the appliances controlled by them. The gas burning appliances ordinarily employed in a dwelling may be operated efficiently with pressures as low as 2" of water. It may be assumed, therefore, that the diaphragm valves 78 of the preferential devices 21 are weighted so as to remain open unless the gas pressure in the piping falls below 2" of water. When the pressure tends to fall below 2" of water the flow of gas to the furnace 15, tank heater 18, and heaters 19 and 20 is restricted by the devices 21 so that the piping 11 will at all times supply gas at suitable pressures to the cook stove 17 and lights 14. If necessary to maintain the gas in the piping 11 at a pressure such as to permit efficient use of the lights 14 and the cook stove 17, the diaphragm valves 78 of the devices 21 will be entirely closed so as to discontinue the main flow of gas to such of the appliances 15, 18, 19, and 20 as may be turned on. In such a case gas will continue to pass through the opening 96 of the preferential device associated with the appliance in use to an extent sufficient to maintain a flame in the appliance.

With the construction described above, it will be seen that the pressure regulating and demand limiting device 13 will deliver a predetermined volume of gas under a uniform pressure to the piping 11 at all times when the amount of gas being burned does not exceed the demand limit of the device 13. At such times as the amount of gas being burned tends to exceed the demand limit, the cook stove 17 and lights 14 will receive the preference, and the valves 78 of the various preferential devices 21 will partially or completely close, so that the flame of any appliance connected therewith will be decreased and may be reduced to a low pilot flame. As some of the burners of the cook stove, for example, are closed, the pressure in the line 11 may be built up to such a stage that sufficient gas will be admitted through the preferential devices to operate the controlled appliances at half of their capacity, if no completely. By using weights 80 of various sizes on the diaphragm valves 78 of the preferential devices 21 the tank heater 18 or the room heaters 19 and 20 may be given preference over the furnace. In this way upon increase in pressure in the piping 11, the tank heater burner would be started up before gas would be supplied to the burner of the furnace.

By this arrangement also it will be apparent, for example, that if the cook stove and the furnace burners were turned on at the same time, the cook stove would have the preference and might burn gas up to the demand limit. If the cook stove is turned on while the furnace is being used, the combustion of gas in the furnace will be decreased automatically and may be completely discontinued except for the pilot flame. This condition will obtain until the stove is turned off. Thereupon the burner of the furnace will immediately be lighted and continue to burn until the burner is closed or some other apparatus having preference over the furnace is turned on. By this means it will be noted that the operation of the various burners is automatic and does not need attention. Provision, further, is made so that the automatic operation of the burners will be safe and not permit gas to escape.

Having fully described the invention what is claimed is;

1. A process of distributing gas to consumers under a readiness-to-serve charge system which includes limiting the rate of which a consumer can take gas from the supply mains, delivering the gas to the consumer at a uniform pressure in all amounts up to a given limit, and automatically reducing the pressure whenever the customer attempts to use gas at a rate above said limit.

2. A process of distributing gas to consumers under a readiness-to-serve charge system which includes limiting the amount of gas which the consumer can take from the supply mains, delivering the gas to the consumer at a uniform pressure in all amounts up to the limit of the demand, and controlling the flow of gas to the appliances of the consumer so as to assure an adequate flow of gas to certain of said appliances at all times regardless of whether the amount of gas available to the consumer is sufficient to afford a full supply to all of the appliances which the consumer may have in use at a particular time.

3. A process of distributing gas to consumers under a readiness-to-serve charge system which includes limiting the individual demands of the consumers and controlling the distribution of the gas available to a consumer so as to give a preference in the consumption of the gas to certain of his appliances over other of his appliances when the amount of gas available to the consumer is insufficient to afford a full supply to all of the appliances which the consumer has in use.

4. A process of distributing gas to consumers which includes automatically limiting the amount of gas which a consumer can take from the supply means in a definite unit of time and substantially discontinuing the flow of gas to certain of the appliances of the consumer, when the amount of gas available to the consumer is insufficient to afford a full supply to all of the appliances which the consumer has in use, in order to cause gas to be delivered at a suitable pressure to other of the consumer's appliances.

5. A method of distributing gas to consumers under a readiness to serve charge system including a fixed charge in accordance with a limited volume of gas which may be supplied in a definite unit of time, and a charge in accordance with the actual volume of gas used, comprising conveying the gas through supply mains at a comparatively high pressure, reducing the pressure of the gas from the supply mains and delivering it at a substantially uniform pressure within the piping of the consumers, and automatically limiting the volume of gas which a consumer can take from the supply mains in a given unit of time.

6. An apparatus for distributing gas to consumers which comprises a supply main, means for limiting the amount of gas which can be withdrawn from the supply main to the appliances of a consumer during any given period of time, a valve for automatically discontinuing the main flow of gas to certain of said appliances when the amount of gas available to the consumer is insufficient to afford a full supply of gas to all the appliances which he has in use, and a housing for said valve constructed to allow a small amount of gas to pass to the appliance controlled by the valve when the valve is closed.

7. An apparatus for distributing gas to consumers comprising a supply main, means for regulating the pressure at which gas passes from the supply main to the appliances of a consumer, means for limiting the amount of gas which the consumer can take from the supply main during any given period of time, and automatic means for substantially discontinuing the flow of gas to certain of said appliances when the amount of gas available to the consumer is insufficient to afford a full supply of gas to all of the appliances which the consumer has in use.

8. An apparatus for distributing gas to consumers comprising a supply main, means for limiting the demand of a consumer on the supply main, and means for automatically restricting the flow of gas to certain of the appliances of the consumer when necessary to assure an adequate supply of gas to other of the consumer's appliances.

9. An apparatus for distributing gas to consumers which comprises a supply main, means for limiting the amount of gas which can be withdrawn from the supply main to the appliances of the consumer during any given period of time, and means for automatically and substantially discontinuing the flow of gas to certain of said appliances when the amount of gas available to the consumer is insufficient to afford a full supply of gas to all of the appliances which he has in use, said means being constructed to allow a small quantity of gas to pass at all times to the appliance controlled by it.

10. An apparatus for distributing gas to consumers which comprises a supply main, means for limiting the amount of gas which can be withdrawn from the supply main to the appliances of the consumer during any given period of time, and a valve controlled by the pressure of the gas and operable automatically to restrict the flow of gas to certain of the appliances of the consumer when necessary to assure a full supply of gas to other of his appliances.

11. An apparatus for distributing gas to consumers comprising a supply main, means for limiting the demand of a consumer on the supply main, means for regulating the pressure at which gas is delivered to the appliances of the consumer, said regulating means being constructed to be rendered inoperative when gas is withdrawn from the supply main at maximum demand, thus permitting the pressure of the gas to fall in accordance with the capacity of the appliances being used, and means associated with certain of said appliances for causing gas to be delivered at suitable pressure to other of the appliances.

12. An apparatus for distributing gas to consumers comprising a supply main, a housing, means in the housing for limiting the demand of a consumer on the supply main, means in the housing for regulating the pressure at which gas is delivered to the appliances of the consumer, said regulating means being constructed to be rendered inoperative when gas is withdrawn from the supply main at maximum demand, thus permitting the pressure of the gas to fall in accordance with the capacity of the appliances being used, and valve mechanism associated with certain of the appliances for substantially discontinuing the flow of gas to such appliances, when necessary to cause gas to be supplied at suitable pressure to other of the appliances.

13. An apparatus for distributing gas to consumers comprising a supply main, mechanism for causing gas to be delivered normally to the appliances of a consumer at a predetermined constant pressure, means for rendering the mechanism inoperative under certain conditions of flow of gas to said appliances, thus permitting the pressure at which gas is withdrawn from the supply mains to vary in accordance with the capacity of the appliances in use, and means associated with certain of said appliances for restricting the flow of gas to said appliances to cause gas to be delivered at suitable pressure to other of the appliances.

14. An apparatus for distributing gas to consumers comprising a supply main, means for limiting the demand of a consumer on the supply main, and means for restricting the flow of gas to certain of the appliances of the consumer when necessary to assure an adequate supply of gas to other of his appliances, said means being adjustable to cause gas to be delivered to some of the first-mentioned appliances in preference to other of such appliances.

In testimony whereof I affix my signature.

JAMES P. FISHER.